United States Patent
Hanan

(10) Patent No.: US 11,873,141 B2
(45) Date of Patent: Jan. 16, 2024

(54) THREADED TAMPER EVIDENCE FINISH AND CLOSURE FOR CONTAINER

(71) Applicant: NIAGARA BOTTLING, LLC, Diamond Bar, CA (US)

(72) Inventor: Jay Clarke Hanan, Glendora, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

(21) Appl. No.: 18/145,407

(22) Filed: Dec. 22, 2022

(65) Prior Publication Data

US 2023/0234754 A1  Jul. 27, 2023

Related U.S. Application Data

(63) Continuation of application No. 16/554,502, filed on Aug. 28, 2019, now abandoned.

(60) Provisional application No. 62/724,548, filed on Aug. 29, 2018.

(51) Int. Cl.
 *B65D 41/34* (2006.01)
 *B65D 1/02* (2006.01)

(52) U.S. Cl.
 CPC ....... *B65D 41/3428* (2013.01); *B65D 1/0246* (2013.01); *B65D 41/3447* (2013.01); *B65D 2401/15* (2020.05)

(58) Field of Classification Search
 CPC .............. B65D 41/3428; B65D 1/0246; B65D 41/3447; B65D 2401/15

USPC ........................................................ 215/252
See application file for complete search history.

(56) References Cited

U.S. PATENT DOCUMENTS

| | | | | |
|---|---|---|---|---|
| 4,907,708 A | * | 3/1990 | Csaszar ............. | B65D 41/3452 215/258 |
| 6,726,042 B2 | * | 4/2004 | Schweigert ........ | B65D 41/3447 215/901 |
| 2001/0002661 A1 | * | 6/2001 | Reidenbach ....... | B65D 41/3428 215/252 |
| 2010/0308050 A1 | * | 12/2010 | Gassner ............. | B65D 41/3447 220/266 |

\* cited by examiner

*Primary Examiner* — James N Smalley
(74) *Attorney, Agent, or Firm* — Michael Best & Friedrich LLP

(57) ABSTRACT

A tamper evidence closure is provided for rotatably engaging with a finish of a container to seal contents within the interior of the container. A multiplicity of thin connections attach a tamper evidence band to a circumference of the tamper evidence closure. A segmented cam extends around the circumference of the tamper evidence band. An angled lower surface of the cam facilitates passing the tamper evidence band over a tamper evidence ledge of the finish during assembly of the tamper evidence closure onto the container. An upper surface of the cam engages with the tamper evidence ledge to break the thin connections and retain the tamper evidence band positioned on the finish during loosening of the tamper evidence closure. Multiple overhang portions above the cam press against an upper portion of the tamper evidence ledge to ensure that the tamper evidence band remains engaged with the tamper evidence ledge.

17 Claims, 3 Drawing Sheets

THREADED TAMPER EVIDENCE FINISH AND CLOSURE FOR CONTAINER

PRIORITY

This application claims priority to U.S. Provisional Patent Applications No. 62/724,548, filed Aug. 29, 2018, the disclosure of which is hereby incorporated herein by reference in its entirety.

FIELD

Embodiments of the present disclosure generally relate to the field of plastic bottles and preforms. More specifically, embodiments of the disclosure relate to tamper evidence container caps and preforms that provide visible indications of removal of the container caps after installation by a manufacturer.

BACKGROUND

Plastic containers have been used as a replacement for glass or metal containers in the packaging of beverages for several decades. The most common plastic used in making beverage containers today is polyethylene terephthalate (PET). Containers made of PET are transparent, thin walled, and have the ability to maintain their shape by withstanding the force exerted on the walls of the container by their contents. PET resins are also reasonably priced and easy to process. PET bottles are generally made by a process that includes the blow-molding of plastic preforms which have been made by injection molding of the PET resin.

Advantages of plastic packaging include lighter weight and decreased breakage as compared to glass, and lower costs overall when taking both production and transportation into account. Although plastic packaging is lighter in weight than glass, there is still great interest in creating the lightest possible plastic packaging so as to maximize the cost savings in both transportation and manufacturing by making and using containers that contain less plastic.

A plastic container for storing liquid contents typically includes a base that extends up to a grip portion suitable for affixing a label, as well as providing a location for grasping the container. The grip portion generally transitions into a shoulder, which connects to a bell. The bell has a diameter that generally decreases as the bell extends upward from the shoulder to a neck and a finish. The finish is adapted to receive a closure, such as a bottle cap, to seal the contents within the interior of the plastic container.

In many instances, the closure includes a tamper evidence band that is disposed around the perimeter of the finish. The tamper evidence band generally remains positioned on the finish when an end-user loosens the closure to access the contents within the container. As such, the tamper evidence band and the finish cooperate to indicate to the end-user whether or not the closure has been previously loosened after being installed by the manufacturer.

A drawback to conventional tamper evidence bands, however, is that in some instances the tamper evidence bands fail to detach from the closure upon being loosened, thereby making it difficult for an end-user to directly observe whether or not the closure has been previously separated from the container. Consequently, the closure may be separated from the tamper evidence band, the container may be refilled, and another closure may be installed onto the container, giving little visual indication to the end-user that the container has been reused.

What is needed, therefore, is a tamper evidence closure that reliably provides a visible indication about whether or not a manufacturer-installed closure has been previously removed from a plastic container.

SUMMARY

Systems and methods for threaded tamper evidence finish and closure for containers include a finish portion of a preform for rotatably engaging with a tamper evidence closure to seal contents within an interior of a container formed from the preform including a cylindrical body that begins at an opening to the interior of the container and extends to and includes a tamper evidence ledge, one or more threads configured to provide a means to fasten the tamper evidence closure to the container, a handling valley disposed between the one or more threads and the tamper evidence ledge, and a bevel disposed at a beginning of the opening and configured to receive a sealing flange of the cap.

In a further embodiment, the tamper evidence ledge is configured to cooperate with a tamper evidence band of the closure to indicate whether or not the closure has been loosened after being installed by a manufacturer.

In another embodiment, the handling valley and the neck portion are configured to enable gripping fingers to engage with and support the container during air-conveying the container along a manufacturing assembly.

In a still further embodiment, the handling valley provides a separation between the tamper evidence ledge and the one or more threads suitable for receiving a pair of gripping fingers of an air conveyor system.

In still another embodiment, the tamper evidence closure includes a tamper evidence band disposed around the circumference of the tamper evidence closure and attached thereto by way of a multiplicity of thin connections.

In a yet further embodiment, the tamper evidence band includes a segmented cam that includes an angled lower surface configured to facilitate passing the tamper evidence band over the one or more threads and the tamper evidence ledge during assembly of the tamper evidence closure onto the finish.

In yet another embodiment, the segmented cam includes an upper surface that is configured to engage with the tamper evidence ledge so as to retain the tamper evidence band positioned on the finish during loosening of the tamper evidence closure, the multiplicity of thin connections breaking during loosening of the tamper evidence closure.

In a further embodiment again, the tamper evidence closure includes a multiplicity of overhang portions configured to press against an upper portion of the tamper evidence ledge to ensure that the tamper evidence band remains engaged with the tamper evidence ledge after removal of the tamper evidence closure from the finish.

In another embodiment again, the tamper evidence band is configured to remain positioned on the finish after the tamper evidence closure is removed from the container, thereby indicating that the tamper evidence closure has been loosened after being installed by a manufacturer.

In many embodiments, a tamper evidence closure for rotatably engaging with a finish of a container to seal contents within the interior of the container includes interior threads that are configured to engage with threads of the finish, a plug seal configured to extend into an opening of the finish whereby contents are sealed in the interior of the container, a multiplicity of thin connections attaching a tamper evidence band to a circumference of the tamper evidence closure, a segmented cam extending around the circumference of the tamper evidence band, and a multiplicity of overhang portions disposed above the segmented cam.

In a further additional embodiment, the segmented cam includes an angled lower surface configured to facilitate passing the tamper evidence band over the threads and a tamper evidence ledge of the finish during assembly of the tamper evidence closure onto the container.

In another additional embodiment, the segmented cam includes an upper surface configured to engage with a tamper evidence ledge of the finish to retain the tamper evidence band positioned on the finish during loosening of the tamper evidence closure, the multiplicity of thin connections breaking during loosening of the tamper evidence closure.

In a still yet further embodiment, the multiplicity of overhang portions are configured to press against an upper portion of a tamper evidence ledge of the finish to ensure that the tamper evidence band remains engaged with the tamper evidence ledge after removal of the tamper evidence closure from the finish.

BRIEF DESCRIPTION OF THE DRAWINGS

The drawings refer to embodiments of the present disclosure in which.

Figure 1:
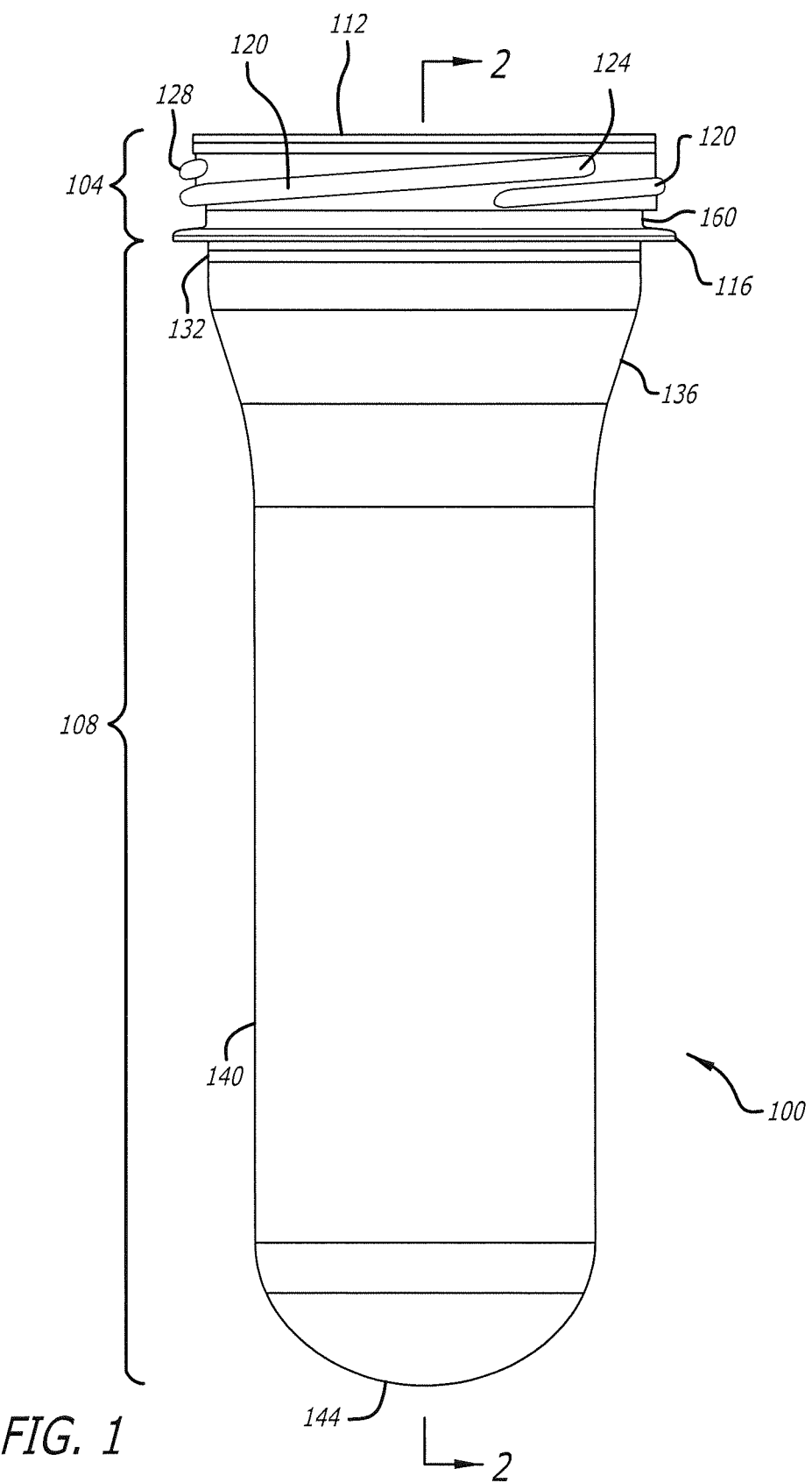
FIG. 1 illustrates a side plan view of an exemplary embodiment of a preform suitable for being blow-molded to form a container in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first preform," may be made. However, the specific numeric reference should not be interpreted as a literal sequential order but rather interpreted that the "first preform" is different than a "second preform." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Disclosed herein are articles, including preforms and tamper evidence closures for containers. In some instances, conventional tamper evidence bands fail to detach from the closure upon being loosened, thereby making it difficult for an end-user to directly observe whether or not the closure has been previously separated from the container. Consequently, the end-user has little visual indication of whether the container has been reused. Embodiments disclosed herein provide a preform and a tamper evidence closure that reliably provides a visible indication about whether or not a manufacturer-installed closure has been previously removed from a plastic container.

FIG. 1 illustrates an exemplary embodiment of a preform 100 suitable for being blow-molded to form a container, or a plastic bottle, according to the present disclosure. The preform 100 preferably can be made of material approved for contact with food and beverages such as virgin PET and can be of any of a wide variety of shapes and sizes. The preform 100 shown in FIG. 1 can be of the type which will form a 12-16 oz. beverage bottle, but as will be understood by those skilled in the art, other preform configurations may be used depending upon the desired configuration, characteristics and use of the final article. The preform 100 may be made by injection molding methods, without limitation.

Figure 2:
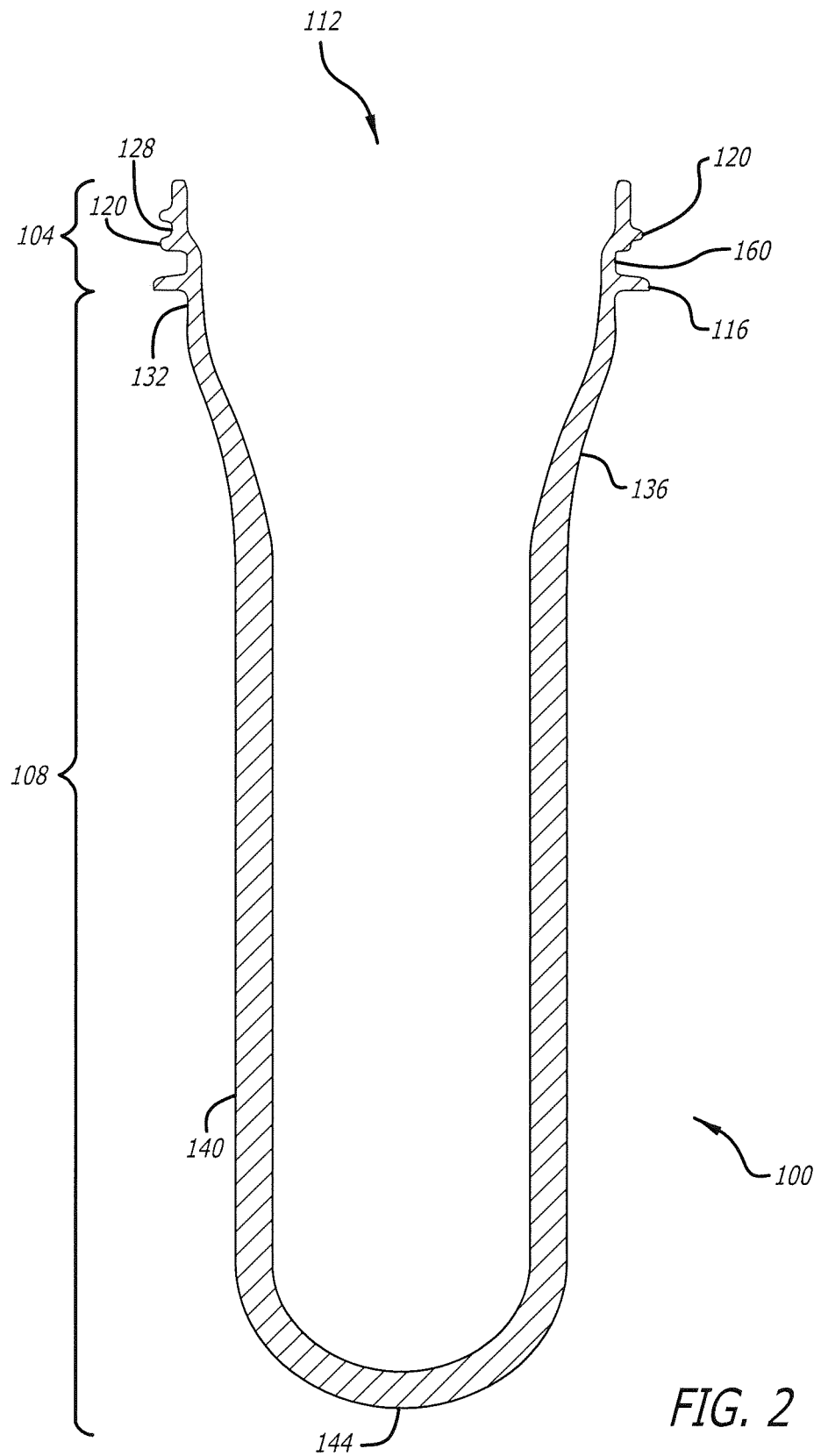
FIG. 2 illustrates a cross-sectional slice view of the preform illustrated in FIG. 1, taken along a line 2-2, according to the present disclosure.

FIG. 2 illustrates a cross-sectional slice view of the preform 100 illustrated in FIG. 1, taken along a line 2-2. The preform 100 includes a finish portion 104 and a body portion 108, formed monolithically (i.e., as a single, or unitary, structure). Advantageously, the monolithic arrangement of the preform 100, when blow-molded into a bottle, provides greater dimensional stability and improved physical properties in comparison to a preform constructed of separate neck and body portions that are bonded together.

The finish portion 104 begins at an opening 112 to an interior of the preform 100 and extends to and includes a tamper evidence ledge 116. The finish portion 104 can be further characterized by the presence of one or more threads 120 configured to provide a means to fasten a closure, such as a cap, to the bottle produced from the perform 100. As such, the threads 120 are configured to rotatably engage with similar threads disposed within the cap to provide a way to seal contents within the bottle. In the embodiment illustrated in FIG. 1, each of the threads 120 generally extends along a section of the circumference of the finish portion 104 and approaches the tamper evidence ledge 116. Thus, when the threads of a cap are engaged with the threads 120, and the cap can be rotated in a clockwise direction, the cap advances toward the tamper evidence ledge 116.

As best shown in FIG. 1, each of the one or more threads 120 begins at a thread start 124 and extends along an angular section of the finish portion 104. The thread start 124 may be configured to guide the thread 120 into a space, or valley 128, between adjacent threads of the cap so as to threadably engage the cap with the finish portion 104. Further, the threads 120 generally are disposed adjacently to one another and are spaced uniformly around the circumference of the finish portion 104. In some embodiments, wherein three threads 120 are disposed around the finish portion 104, the thread starts 124 of adjacent threads 120 are spaced at substantially 120-degree intervals around the perimeter of the finish portion 104. As will be appreciated, however, more or less than three threads 120 may be incorporated into the finish portion 104 without deviating beyond the scope of the present disclosure.

The body portion 108 includes a neck portion 132 that extends to a tapered portion 136 of the body portion 108. The tapered portion 136 comprises a smooth transition from a diameter of the neck portion 132 to a relatively smaller diameter of a cylindrical portion 140 of the preform 100. The cylindrical portion 140 can be a generally elongate member that culminates in an end cap 144. In some embodiments the body portion 108 may be generally cylindrical, and the end cap 144 may be conical or frustoconical and may also be hemispherical, and the very terminus of the end cap 144 may be flattened or rounded.

As best shown in FIG. 2, a wall thickness of the cylindrical portion 140 can be substantially uniform throughout the cylindrical portion 140 and the end cap 144. A wall thickness of the tapered portion 136, however, generally decreases from the wall thickness of the cylindrical portion 140 to a relatively thinner wall thickness of the neck portion 132. As will be appreciated, the wall thickness of the cylindrical portion 140 can be relatively greater than the wall thickness of the neck portion 132 so as to provide a wall thickness at the desired dimensions of a finished product after the preform 100 is blow-molded into the shape and size of a bottle. As such, the wall thickness throughout most of the body portion 108 will depend upon the overall size of the perform 100 and the wall thickness and overall size of the resulting container.

Figure 3:
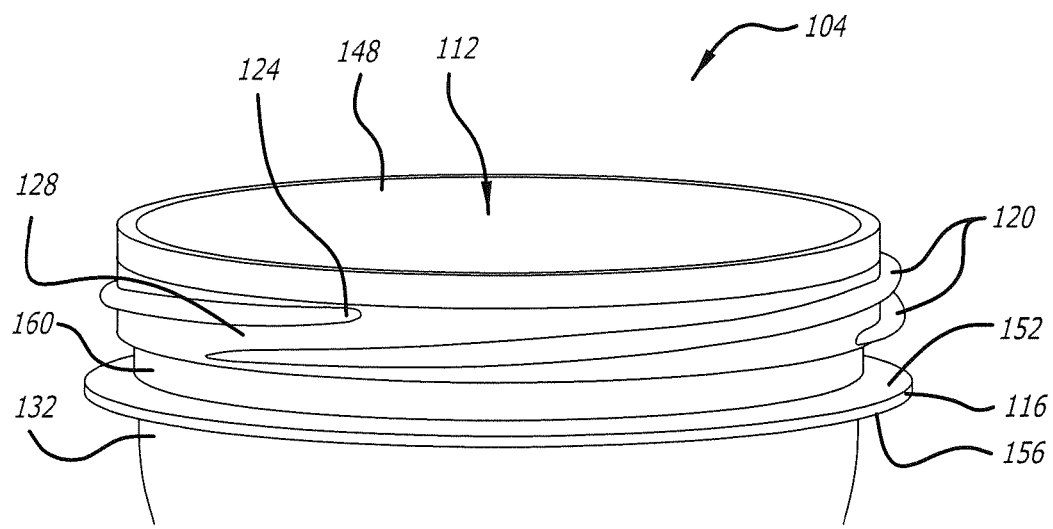
FIG. 3 illustrates an isometric view of a finish portion comprising the preform of FIGS. 1-2.

FIG. 3 illustrates an isometric view of the finish portion 104 comprising the preform 100 illustrated in FIGS. 1-2, according to the present disclosure. As described hereinabove, the finish portion 104 includes one or more threads 120 extending along sections of the circumference of the finish portion 104 and approaching the tamper evidence ledge 116. The threads 120 generally extend outward from the finish portion 104 such that a valley 128 can be disposed between adjacent threads. The cross-sectional profile of the threads 120 may be configured such that the threads advantageously engage with similar threads disposed within the cap for sealing contents within the container formed by blow-molding the preform 100. As will be recognized by those skilled in the art, the valley 128 can be configured to allow passage of a thread disposed in the cap to pass between adjacent threads 120 during tightening of the cap onto the finish portion 104.

With continuing reference to FIG. 3, the finish portion 104 includes a bevel 148 disposed at the beginning of the opening 112. The bevel 148 can be configured to enter into sliding contact with a sealing flange of a suitable cap so as to prevent contents from leaking out of the container formed from the preform 100. In some embodiments, the bevel 148 may compress the sealing flange to a predetermined degree, thereby forming a tight seal suitable to retain pressurized contents within the container.

As further shown in FIG. 3, the tamper evidence ledge 116 comprises a rounded upper portion 152 and a substantially flat lower portion 156. As will be appreciated, the rounded upper portion 152 facilitates passing a tamper evidence band of the cap over the tamper evidence ledge 116 during assembly of the cap onto the container. The flat lower portion 156 can be configured to retain the tamper evidence band positioned below the tamper evidence ledge 116 during loosening of the cap. For example, when the cap is initially installed onto the container by a manufacturer, the tamper evidence band easily passes over the tamper evidence ledge 116 due to the rounded upper portion 152. When an end-user later loosens the cap, the flat lower portion 156 retains the tamper evidence band below the tamper evidence ledge 116, causing the tamper evidence band to break loose from the cap. Thus, the flat lower portion 156 of the tamper evidence ledge 116 and the tamper evidence band of the cap cooperate to indicate to the end-user that the cap has not been previously loosened after being installed by the manufacturer. It should be understood, however, that the tamper evidence ledge 116 is not limited to being coupled with tamper evidence bands, as described above, but rather the tamper evidence ledge 116 may be configured to operate with any of various devices for indicating whether or not the container has been previously opened.

Disposed between the tamper evidence ledge 116 and the threads 120 is a handling valley 160 that extends circumferentially around the finish portion 104. Further, the handling valley 160 comprises a portion of the finish 104 that has a wall thickness and a diameter that are substantially similar to the wall thickness and diameter of the neck portion 132, below the tamper evidence ledge 116. As such, the handling valley 160 and the neck portion 132 advantageously enable gripping fingers to engage with and support the container during air-conveying the container along a manufacturing assembly. For example, a first pair of gripping fingers can extend into the handling valley 160 to support the container at a first station of a manufacturing line. Then, upon being conveyed to a second station, a second pair of gripping fingers can extend around the neck portion 132, below the tamper evidence ledge 116, while the first pair of gripping fingers are removed from the handling valley 160. Similarly, upon arriving at a third station, a third pair of gripping fingers can engage with the handling valley 160 while the second pair of gripping fingers are removed from the neck portion 132. Thus, the container can be transported along the manufacturing line by alternatingly engaging gripping fingers with the handling valley 160 and the neck portion 132.

As will be appreciated, the handling valley 160 provides a separation between the tamper evidence ledge 116 and the threads 120 suitable for receiving the pair of gripping fingers, as described above. In general, the separation must be large enough to allow the gripping fingers to easily pass between the tamper evidence ledge 116 and the threads 120. As such, any of various separations, greater than the width of the gripping fingers, may be disposed between the tamper evidence ledge 116 and the threads 120, without limitation and without deviating beyond the scope of the present disclosure.

Figure 4:
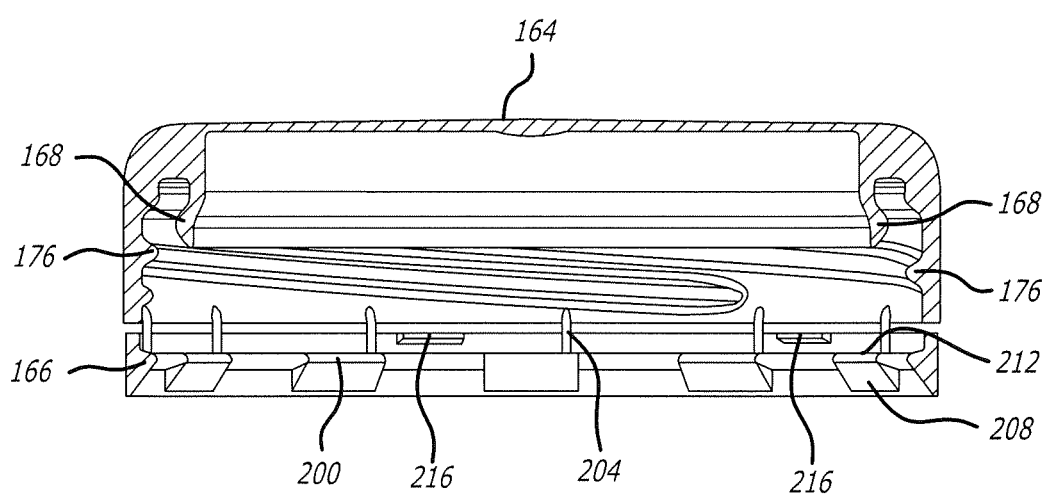
FIG. 4 illustrates a cross-sectional view of a tamper evidence closure suitable for being coupled with the finish portion of FIG. 3 to provide an indication of whether or not the closure has been loosened after being installed by a manufacturer.

FIG. 4 illustrates a cross-sectional view of a tamper evidence closure 164 suitable for being threadably engaged with the finish 104 of FIG. 3 to provide an indication of whether or not the closure 164 has been loosened after being installed by a manufacturer. The closure 164 includes interior threads 176 that are configured to engage with the threads 120 of the finish 104, as described above. As such, the threads 176 extend into the thread valleys 128 extending around the finish 104. During tightening of the closure 164 onto the finish 104, a plug seal 168 of the closure 164 can be configured to extend into the opening 112 and enter into a pressed relationship with the finish 104 whereby contents are sealed in the interior of a container formed from the preform 100 (hereinafter "container 100").

As further shown in FIG. 4, the closure 164 includes a tamper evidence band 166 that includes a segmented cam 200 and can be disposed around the perimeter of the closure 164. The tamper evidence band 166 can be attached to the closure 164 by a multiplicity of thin connections 204. The segmented cam 200 generally comprises an angled lower surface 208 configured to facilitate passing the tamper evidence band 166 over the threads 120 and the rounded upper portion 152 of the tamper evidence ledge 116 during assembly of the closure 164 onto the container 100. A relatively flat upper surface 212 of the segmented cam 200 may be configured to engage with the flat lower portion of the tamper evidence ledge 116 and thus retain the tamper evidence band 166 engaged with the tamper evidence ledge 116 during loosening of the closure 164.

Once the closure 164 can be installed onto the finish 104 by a manufacturer and later an end-user loosens the closure 164, the segmented cam 200 presses against the flat lower portion 156 of the tamper evidence ledge 116, breaking the thin connections 204 between tamper evidence band 166 and the closure 164. The tamper evidence band 166 remains positioned on the tamper evidence ledge 116 after the closure 164 is removed from the container 100. Multiple overhang portions 216 disposed above the segmented cam 200 of the closure 164 are configured to press against the rounded upper portion 152 of the tamper evidence ledge 116. The overhand portions 216 ensure that the tamper evidence band 166, once free of the closure 164, does not fall below the tamper evidence ledge 116 and reside around the neck 132 of the container 100. Thus, the tamper evidence band 166 cooperates with the tamper evidence ledge 116 to indicate to the end-user whether or not the closure 164 has been previously loosened after being installed by the manufacturer.

The articles described herein may be made from any suitable thermoplastic material, such as polyesters including polyethylene terephthalate (PET), polyolefins, including polypropylene and polyethylene, polycarbonate, polyamides, including nylons (e.g. Nylon 6, Nylon 66, MXD6), polystyrenes, epoxies, acrylics, copolymers, blends, grafted polymers, and/or modified polymers (monomers or portion thereof having another group as a side group, e.g. olefin-modified polyesters). These materials may be used alone or in conjunction with each other. More specific material examples include, but are not limited to, ethylene vinyl alcohol copolymer ("EVOH"), ethylene vinyl acetate ("EVA"), ethylene acrylic acid ("EAA"), linear low density polyethylene ("LLDPE"), polyethylene 2,6- and 1,5-naphthalate (PEN), polyethylene terephthalate glycol (PETG), poly(cyclohexylenedimethylene terephthalate), polystryrene, cycloolefin, copolymer, poly-4-methylpentene-1, poly(methyl methacrylate), acrylonitrile, polyvinyl chloride, polyvinylidine chloride, styrene acrylonitrile, acrylonitrile-butadiene-styrene, polyacetal, polybutylene terephthalate, ionomer, polysulfone, polytetra-fluoroethylene, polytetramethylene 1,2-dioxybenzoate and copolymers of ethylene terephthalate and ethylene isophthalate. In certain embodiments preferred materials may be virgin, pre-consumer, post-consumer, regrind, recycled, and/or combinations thereof.

In some embodiments, polypropylene also refers to clarified polypropylene. As used herein, the tem). "clarified polypropylene" is a broad term and can be used in accordance with its ordinary meaning and may include, without limitation, a polypropylene that includes nucleation inhibitors and/or clarifying additives. Clarified polypropylene is a generally transparent material as compared to the homopolymer or block copolymer of polypropylene. The inclusion of nucleation inhibitors helps prevent and/or reduce crystallinity, which contributes to the haziness of polypropylene, within the polypropylene. Alternatively, nucleation inhibitors may be added to polypropylene.

As used herein, "PET" includes, but is not limited to, modified PET as well as PET blended with other materials. One example of a modified PET can be IPA-modified PET, which refers to PET in which the IPA content is preferably more than about 2% by weight, including about 2-10% IPA by weight, also including about 5-10% IPA by weight. In another modified PET, an additional comonomer, cylohexane dimethanol (CHDM) can be added in significant amounts (e.g. approximately 40% by weight or more) to the PET mixture during manufacture of the resin.

Additives may be included in articles herein to provide functional properties to the resulting containers. Such additives include those providing enhanced gas barrier, UV protection, scuff resistance, impact resistance and/or chemical resistance. Preferred additives may be prepared by methods known to those of skill in the art. For example, the additives may be mixed directly with a particular material, or they may be dissolved/dispersed separately and then added to a particular material. Additives may be present in an amount up to about 40% of the material, also including up to about 30%, 20%, 10%, 5%, 2% and 1% by weight of the material. In some embodiments, additives may be present in an amount less than or equal to 1% by weight, such ranges of materials including, but not limited to, about 0.01% to about 1%, about 0.01% to about 0.1%, and about 0.1% to about 1% by weight.

Another possible additive can be microparticulate clay or graphene based materials. These materials comprise tiny, micron or sub-micron size (diameter), particles of materials which enhance the barrier and/or mechanical properties of a material by creating a more tortuous path for migrating gas molecules, such as oxygen or carbon dioxide, to take as they permeate a material and/or providing added stiffness. In some embodiments, nanoparticulate material can be present in amounts ranging from 0.05 to 1% by weight, including 0.1%, 0.5% by weight and ranges encompassing these amounts. In some embodiments, nanoparticles comprise monmorillonite that may be modified with a ternary or quaternary ammonium salt. In some embodiments, such particles comprise organoclays as described in U.S. Pat. No. 5,780,376, the entire disclosure of which is hereby incorporated by reference and forms part of the disclosure of this application. Other suitable organic and inorganic microparticulate clay based or nano-sized products may also be used. Both man-made and natural products are also suitable.

In some embodiments, the UV protection properties of the material may be enhanced by the addition of one or more additives. In one embodiment, the UV protection material used provides UV protection up to about 350 nm or less, preferably about 370 nm or less, more preferably about 400 nm or less. The UV protection material may be used as an additive with layers providing additional functionality or applied separately as a single layer. In some embodiments, additives providing enhanced UV protection are present in the material from about 0.05 to 20% by weight, but also including about 0.1%, 0.5%, 1%, 2%, 3%, 5%, 10%, and 15% by weight, and ranges encompassing these amounts. In some embodiments, the UV protection material is added in a form that can be compatible with the other materials. In some embodiments, a preferred UV protection material comprises a polymer grafted or modified with a UV absorber that can be added as a concentrate. Other preferred UV protection materials include, but are not limited to, benzotriazoles, phenothiazines, and azaphenothiazines. UV protection materials may be added during the melt phase process prior to use, such as prior to injection molding or extrusion.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A tamper evidence closure for rotatably engaging with a finish of a container to seal contents within the interior of the container, the tamper evidence closure comprising:
   interior threads configured to engage with threads of the finish;
   a plug seal configured to extend into an opening of the finish whereby contents are sealed in the interior of the container;
   a multiplicity of thin connections attaching a tamper evidence band to a circumference of the tamper evidence closure;
   a segmented cam extending around the circumference of the tamper evidence band about a closure axis, the segmented cam including at least six separated surfaces each having a nonzero and nonorthogonal angle relative to the closure axis, the segmented cam integrally formed as one piece with the tamper evidence band; and
   a plurality of overhang portions disposed above the segmented cam and configured to support the tamper evidence band on an upper portion of a tamper evidence ledge of the finish after separation of the tamper evidence closure from the finish,
   wherein each of the overhang portions is circumferentially positioned between adjacent separated surfaces of the at least six separated surfaces.

2. The tamper evidence closure of claim 1, wherein the at least six separated surfaces are configured to facilitate passing the tamper evidence band over the threads and the tamper evidence ledge of the finish.

3. The tamper evidence closure of claim 1, wherein the segmented cam includes an upper surface configured to engage with the tamper evidence ledge of the finish to retain the tamper evidence band positioned on the finish during loosening of the tamper evidence closure.

4. The tamper evidence closure of claim 3, wherein the upper surface is orthogonal relative to the closure axis.

5. The tamper evidence closure of claim 1, wherein the multiplicity of thin connections includes at least six thin connections, and wherein each of the at least six thin connections is axially aligned with a respective separated surface of the at least six separated surfaces.

6. The tamper evidence closure of claim 1, wherein each of the overhang portions is circumferentially centered between adjacent separated surfaces of the at least six separated surfaces.

7. The tamper evidence closure of claim 1, wherein each of the overhang portions includes an angled surface on a side nearest the segmented cam.

8. The tamper evidence closure of claim 1, wherein the plurality of overhang portions are integrally formed as one piece with the tamper evidence band.

9. The tamper evidence closure of claim 1, wherein each thin connection of the multiplicity of thin connections is coupled on a first end to an inner surface of the tamper evidence band and a on a second end to an inner surface of the tamper evidence closure.

10. The tamper evidence closure of claim 9, wherein each thin connection of the multiplicity of thin connections extends across a gap between the tamper evidence band and the tamper evidence closure.

11. A tamper evidence closure for rotatably engaging with a finish of a container to seal contents within the interior of the container, the tamper evidence closure comprising:
    interior threads that are configured to engage with threads of the finish;
    a multiplicity of thin connections attaching a tamper evidence band to a circumference of the tamper evidence closure;
    a segmented cam extending around the circumference of the tamper evidence band about a closure axis, the segmented cam integrally formed with the tamper evidence band and including a plurality of separated surfaces each having a nonzero and nonorthogonal angle relative to the closure axis; and
    a plurality of overhang portions axially spaced from the segmented cam and configured to support the tamper evidence band on an upper portion of a tamper evidence ledge of the finish after separation of the tamper evidence closure from the finish, each overhang portion of the plurality of overhang portions circumferentially positioned between adjacent separated surfaces of the plurality of separated surfaces.

12. The tamper evidence closure of claim 11, wherein the plurality of separated surfaces includes at least six discrete surfaces.

13. The tamper evidence closure of claim 11, wherein each of the separated surfaces is configured to facilitate passing the tamper evidence band over the threads and a tamper evidence ledge of the finish during assembly of the tamper evidence closure onto the container.

14. The tamper evidence closure of claim 11, wherein the segmented cam is integrally formed as one piece with the tamper evidence band.

15. The tamper evidence closure of claim 14, wherein the plurality of overhang portions are integrally formed as one piece with the segmented cam and the tamper evidence band.

16. The tamper evidence closure of claim 11, wherein the segmented cam includes an upper surface configured to engage with the tamper evidence ledge of the finish to retain the tamper evidence band positioned on the finish during loosening of the tamper evidence closure.

17. The tamper evidence closure of claim 16, wherein the upper surface is orthogonal relative to the closure axis.

* * * * *